Sept. 6, 1949. T. CLARK ET AL 2,481,290
DRIVE FOR CONTRAROTATING PROPELLERS
Filed Nov. 3, 1947 2 Sheets-Sheet 2
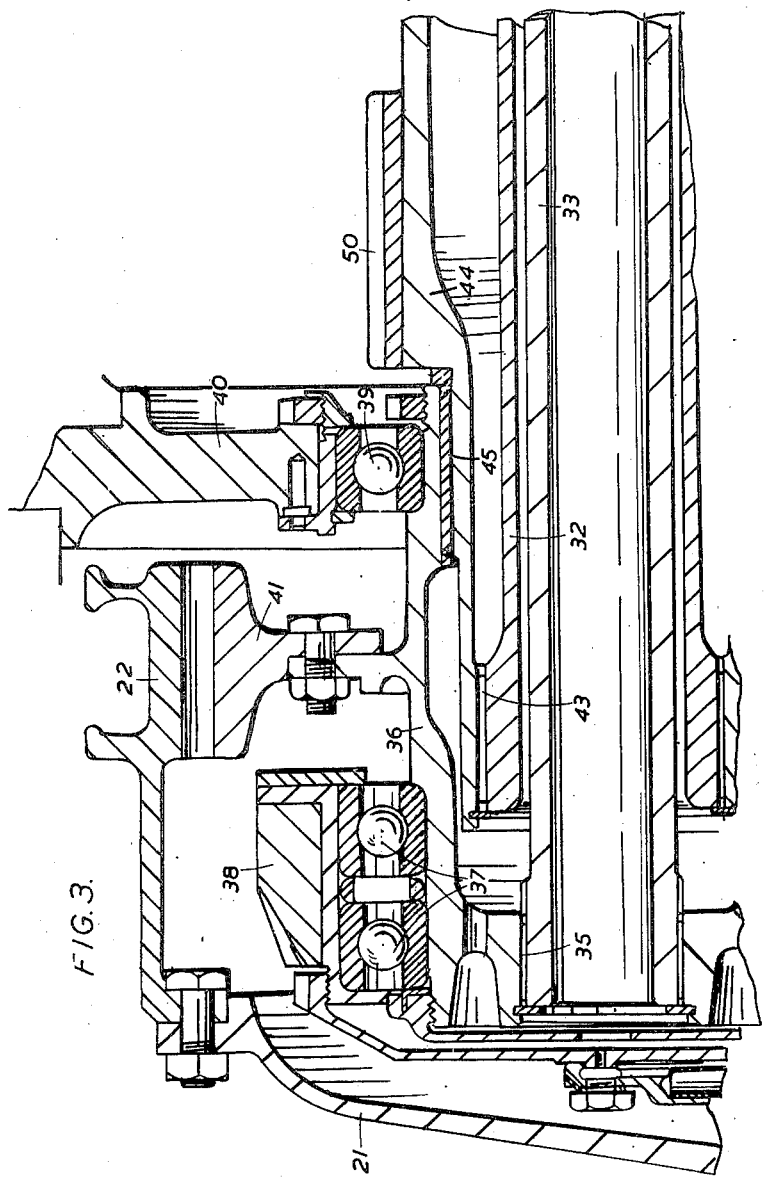
Inventor
by THOMAS CLARK &
DAVID HARRIMAN
Attorney Patented Sept. 6, 1949

2,481,290

UNITED STATES PATENT OFFICE 2,481,290

DRIVE FOR CONTRAROTATING PROPELLERS

Thomas Clark and David Harriman, Coventry, England, assignors to Armstrong Siddeley Motors Limited, Coventry, England Application November 3, 1947, Serial No. 783,688
In Great Britain August 30, 1947

6 Claims. (Cl. 74—665)

The main object of this invention is to provide an improved drive means, for coaxial, contra-rotating propeller shafts arranged one within the other, the inner extending further rearwardly (away from the propellers) than the outer, of the kind in which there is a single coaxial driving shaft or the like by which a common driving gear for the propeller shafts is driven. Although not limited in this respect, the invention is particularly applicable to a drive means in which the prime mover is an internal-combustion turbine unit, the common driving gear being, for example, fast with the planet carrier of a planetary gearing having an internally-toothed annulus, serving as a reaction member, and a driving sun gear.

The invention broadly consists in a drive means including a plurality of similar layshaft means symmetrically spaced angularly round the axis of the propeller shafts and each including a drive shaft connected to be driven by the said common driving gear, two driven shafts respectively connected to drive the propeller shafts reversely, and torsion bar means interconnecting the said drive shaft and the said driven shafts of the layshaft means.

According to a further feature of the invention, the drive means includes a plurality of similar layshaft means symmetrically spaced angularly round the axis of the propeller shafts and each including a journalled hollow drive shaft fast with a gear to be driven from the said common driving gear, a torsion bar means extending within and through the said hollow drive shaft, and separate external journalled driven shafts coaxial with the torsion bar means and connected to be driven from the free end thereof, the said external driven shafts respectively driving reversely, as through externally-toothed and internally-toothed gears, to common gears fast on the said propeller shafts, respectively.

In the accompanying drawings:

Figure 3 is a similar view of the driven end of the layshaft means.

Figure 1:
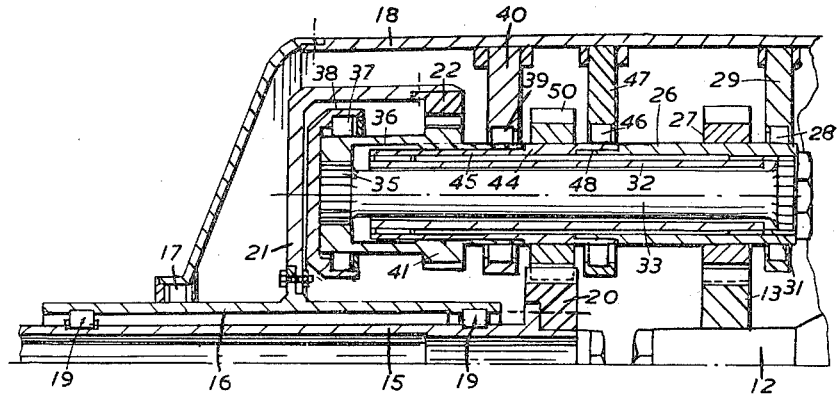
Figure 1 is a fragmentary diagrammatic view, in sectional elevation, showing one form of drive means according to the invention.
Figure 2:
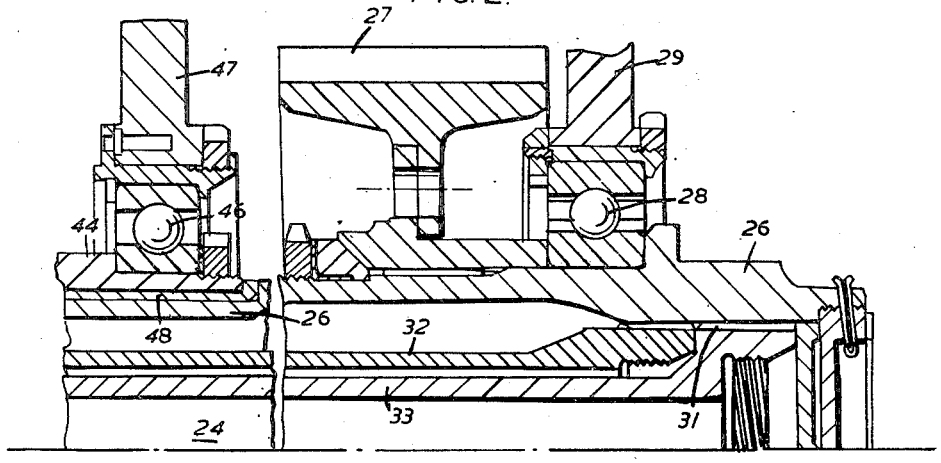
Figure 2 is a fragmentary sectional elevation, to a larger scale, of the driving end of one of the layshaft means.

The drawings show a driving shaft 12 having fast on it a driving gear 13 which is common to the various layshaft means. The driving shaft 12 and driving gear 13 may be driven by the planet carrier of a planetary gearing of which an internally-toothed annulus serves as the reaction member, the drive from the prime-mover, for example, an internal-combustion turbine unit, being applied to an externally-toothed sun gear. The planetary gearing may be arranged as disclosed in British patent specification No. 614,960.

Coaxial with the driving shaft 12 is an inner propeller shaft 15 and an external propeller shaft 16 to carry the propellers at their outer (left-hand) ends, and the outer shaft 16 is shown diagrammatically as being journalled by means of a combined thrust and journal bearing 17 in a casing 18 for the drive means, and journalled on the inner propeller shaft 15 at 19, 19.

The inner shaft 15 extends inwardly (remote from the propellers) beyond the inner end of the outer shaft 16 and has fast on it a gear 20 by which it may be driven. The outer shaft 16 is fast with a plate or the like 21 carrying an internally-toothed annulus 22 by which it can be driven.

In the present instance use is made of four layshaft means, indicated generally by the reference character 24, which are parallel to one another and angularly spaced from one another symmetrically round the axis of the propeller shaft, though only one of these layshaft means appears in the drawings. They are, however, all similar to one another.

Each layshaft means includes a hollow drive shaft 26, which is journalled in any convenient manner and has fast on it a gear 27, all the four gears 27 being in mesh with the common driving gear 13. For journalling purposes the drawings show a ball-bearing 28 carried by a bracket 29 fast with the casing 18.

The right-hand end of the hollow shaft 26 is internally splined at 31, and engaged therewith are corresponding splines on coaxial torsion bars 32, 33 arranged one within the other. The inner torsion bar 33, shown in elevation in Figure 1, extends beyond the left-hand end of the outer torsion bar 32 and has a splined engagement, as shown at 35, with a coaxial external driven shaft 36. The latter is journalled in bearings, indicated at 37, in a housing 38 which is supported from a bracket 40 by arms on opposite sides of the shaft 36. At its other end the outer driven shaft 36 is journalled at 39 in the bracket 40, which is carried by the stationary casing 18. Between its ends is secured an externally-toothed gear 41. All the four gears 41 of the four layshaft means are in mesh with the internally-toothed annulus 22.

The left-hand end of the outer torsion bar 32 is externally splined, as shown at 43, and engaged with a hollow driven shaft 44 coaxial with the driven shaft 36 and journalled therein at 45 where the driven shaft 36 is supported by the bearing 39. Its right-hand end is journalled in a ball-bearing 46 carried by a bracket 47 fast with the stationary casing 18, and, in addition, its right-hand end has journalled in it, as indicated at 48, the left-hand end of the drive shaft 26. In between its ends it carries an externally-toothed gear 50 and all the four gears 50 of the four layshaft means are in mesh with the gear 20.

By this means power is transmitted in a very balanced manner to the two contra-rotating propeller shafts.

What we claim as our invention and desire to secure by Letters Patent of the United States is:

1. Drive means, for coaxial contra-rotating propeller shafts arranged one within the other, the inner extending further from the propellers than the outer, including a common driving gear coaxial with but rotatively free of the propeller shafts, a plurality of similar layshaft means symmetrically spaced angularly round the axis of the propeller shafts and each including a drive shaft connected to be driven by said common gear, two driven shafts respectively connected to drive the propeller shafts reversely, and two torsion bar means respectively interconnecting each of the said driven shafts of the layshaft means with said drive shaft.

2. Drive means, for coaxial contra-rotating propeller shafts arranged one within the other, the inner extending further from the propellers than the outer, including a common driving gear coaxial with but rotatively free of the propeller shafts, a plurality of similar layshaft means symmetrically spaced angularly round the axis of the propeller shafts and each including a journalled hollow drive shaft fast with a gear to be driven from said common gear, two torsion bar means extending within and through said hollow drive shaft and driven therefrom, and two separate external journalled driven shafts coaxial with the torsion bar means and respectively connected to be driven from the free ends thereof, said external driven shafts carrying gears respectively driving reversely to common gears fast on the propeller shafts respectively.

3. Drive means, for coaxial contra-rotating propeller shafts arranged one within the other, the inner extending further from the propellers than the outer, including a common driving gear coaxial with but rotatively free of the propeller shafts, a plurality of similar layshaft means symmetrically spaced angularly round the axis of the propeller shafts and each including a journalled hollow drive shaft fast with a gear to be driven from said common gear, two coaxial torsion bars extending within and through said hollow drive shaft by different amounts and driven at adjacent ends from said hollow drive shaft, and separate external journalled driven shafts coaxial with said torsion bars and respectively connected to be driven from the free ends thereof, said external driven shafts carrying gears respectively driving common externally-toothed and internally-toothed gears fast on the propeller shafts respectively.

4. Drive means, according to claim 1, in which the two coaxial torsion bars are splined at one end to the said drive shaft and at their other ends to the said driven shafts respectively.

5. Drive means, according to claim 3, in which said torsion bars at their driving ends are splined to common splines on said drive shaft.

6. Drive means, for coaxial contra-rotating propeller shafts arranged one within the other, the inner extending further from the propellers than the outer, including a stationary casing, a common driving gear coaxial with the propeller shafts, a plurality of similar layshaft means symmetrically spaced angularly round the axis of the propeller shafts and each including a hollow drive shaft journalled in said casing and fast with a gear to be driven from said common gear, torsion bar means extending within and through said hollow drive shaft and driven from said driven shaft, and separate external driven shafts coaxial with the torsion bar means and connected to be driven from the free end thereof, said external driven shafts being journalled in said casing and carrying gears respectively driving common externally-toothed and internally-toothed gears fast on the propeller shafts respectively.

THOMAS CLARK.
DAVID HARRIMAN.

REFERENCES CITED

The following references are of record in the file of this patent:

UNITED STATES PATENTS

| Number | Name | Date |
|---|---|---|
| 2,091,637 | Hoffman et al. | Aug. 31, 1937 |
| 2,372,883 | Daub | Apr. 3, 1945 |